United States Patent [19]

Miyazaki et al.

[11] Patent Number: 5,047,067
[45] Date of Patent: Sep. 10, 1991

[54] REACTIVE DYESTUFF COMPOSITION FOR CELLULOSE FIBERS: REACTIVE DYES WITH SIMILAR HUE BUT DIFFERENT REACTIVE GROUPS AND SUBSTANTIVITIES

[75] Inventors: Koichi Miyazaki, Osaka; Hachiro Hirooka, Hyogo, both of Japan

[73] Assignee: Hoechst Aktiengesellschaft, Frankfurt, Fed. Rep. of Germany

[21] Appl. No.: 275,778

[22] Filed: Nov. 23, 1988

[30] Foreign Application Priority Data

Nov. 27, 1987 [JP] Japan .............................. 62-297707

[51] Int. Cl.$^5$ .................. C09B 62/50; C09B 67/22; D06P 3/66; D06P 1/38
[52] U.S. Cl. .................................. 8/549; 8/638; 8/674; 8/676; 8/679; 8/680; 8/685; 8/686; 8/688; 8/918
[58] Field of Search .................................. 8/549, 638

[56] References Cited

U.S. PATENT DOCUMENTS 4,338,093 7/1982 Hildebrand et al. .................... 8/549
4,711,641 12/1987 Nakamatsu et al. .................... 8/524

OTHER PUBLICATIONS

Zollinger, H, "Color Chemistry", (VCH Publishers), 1987, pp. 142–143 and 169–170.

Primary Examiner—A. Lionel Clingman

[57] ABSTRACT

A reactive dyestuff composition containing, as a dyestuff component, at least two different reactive dyestuffs which present similar color hue upon dyeing cellulose and have different reactive groups and different substantivities is disclosed. Preferably, the composition contains at least one reactive dyestuff having either a $\beta$-sulfatoethyl-sulfone group or vinylsulfone group and at least one reactive dyestuff having a halogenated triazine group. The composition is suitable for dyeing cellulose fibers.

2 Claims, 7 Drawing Sheets

EXHAUSTION & FIXATION CURVE

BLUE DYESTUFF NO. 1

FIG. 3

EXHAUSTION & FIXATION CURVE

BLUE DYESTUFF NO. 2

FIG. 7

EXHAUSTION & FIXATION CURVE

RED DYESTUFF NO. 5

REACTIVE DYESTUFF COMPOSITION FOR CELLULOSE FIBERS: REACTIVE DYES WITH SIMILAR HUE BUT DIFFERENT REACTIVE GROUPS AND SUBSTANTIVITIES

BACKGROUND OF THE INVENTION

This invention relates to reactive dyestuff compositions for cellulose fibers and to a method of dyeing the cellulose fibers by using the reactive dyestuff compositions.

Textile materials having free OH groups such as cellulose, having NH groups such as sheep wool and silk, and materials containing carbonamide groups can be dyed into all color tones or hues by using reactive dyestuffs on the present level of the technique of this field. Formation of a covalent bond between the dyestuff and the textile material provides a high fastness property of these dyeings. The reactive dyestuff is frequently applied to the textile material from an aqueous dyeing bath in accordance with the exhaust method. The temperature for the dyeing method is in most cases 40° to 90° C.

The dyeing result of the reactive dyestuff is dependent on the substantivity of the reactive dyestuff, that is, the dyeability, on the diffusion and the migration, and on the reactivity of the reactive group with the textile material, which are remarkably affected by the dyeing parameters, that is, the temperature of dyeing, the content of electrolytes in a dye liquor, the pH value of the dye liquor and so on. Therefore, in order to obtain an optimal dye concentration and a good leveling property, the reactive dyestuff must be used for dyeing in a narrow limited range of the temperature with the addition of the proper electrolytes and alkalis.

Furthermore, the dyeing result of the reactive dyestuff is dependent on the used amount of the dye liquor for the textile material, so-called bath ratio.

From these facts, it has been thought that a different dyestuff requires a different dyeing method for the optimum use.

In practice, it has been generally carried out that the reactive dyestuffs are used as a mixture of two or three, or, in a rare case, more reactive dyestuff components in order to obtain a constant color tone. In particular, it is preferably carried out to use a trichromatic combination (Trichromie). In this case, most of all possible color tone can be obtained by mixing clear yellow with red and brilliant blue in a suitable mixing ratio. The reactive dyestuffs in the respective colors to be used for such combination dyeing should have similar dyeing properties, that is, the combination dyeing should not be varied by the influence of dyeing parameters such as the temperature, the addition of the electrolytes and the bath ratio. Accordingly, it is required for the reactive dyestuff compositions to dye without substantially being influenced with the dyeing temperature, the addition of the salts and the bath ratio.

For example, West German patent publication No. 2,442,553, European patent application Nos. 209,494 and 198,198 disclose the examples of mixing of the reactive dyestuffs. The objects of the mixtures disclosed in the above references are however to improve the solubility of the dyestuffs in water or the exhaustion property of the dyestuffs so as to make it possible to produce the dye liquor which gives a sufficient concentration. Furthermore, European patent application No. 44,483 discloses only that the mixture of at least two red azo reactive dyestuffs which dye in the same color tone has less sensitivity to the change of dyeing parameters.

The combination of reactive dyestuffs is carried out not only in case of the reactive dyestuffs having only one reactive group in a molecule of the dyestuff but also in case of the reactive dyestuffs having two or more reactive groups in a molecule. That is, it is carried out to mix three kinds of reactive dyestuffs of yellow, red and blue which have, for example, both a $\beta$-sulfatoethyl-sulfonyl group and a triazine group (it is not referred to herein that the latter is halogenated or not.) in a molecule to obtain various color tones.

However, a few kinds of the reactive dyestuffs, in particular, the two-functional dyestuffs to be actually industrially used prevent us from obtaining a variety of color tones.

SUMMARY OF THE INVENTION

Accordingly an object of the invention is to substantially eliminate the problems described above and to provide a dyestuff mixture capable of producing a constant dyeing over a wide range of the temperature without substantially being influenced with the addition of the salts and the bath ratio, particularly for use as one color in the trichromatic combination.

This and other objects can be achieved according to this invention by providing a reactive dyestuff composition containing, as a dyestuff component, at least two different reactive dyestuffs which present similar color hue upon dyeing cellulose and have different reactive groups and different substantivities.

In preferred embodiment according to this invention, the reactive dyestuff composition containing as the dyestuff components, at least one reactive dyestuff having either a $\beta$-sulfatoethyl-sulfone group or a vinylsulfone group and at least one reactive dyestuff having a halogenated triazine group.

DESCRIPTION OF THE PREFERRED EMBODIMENT

The reactive dyestuff composition of this invention contains as the dyestuff components, at least two reactive dyestuffs, preferably at least one reactive dyestuff having either a $\beta$-sulfatoethyl-sulfone group or a vinylsulfone group and at least one reactive dyestuff having a halogenated triazine group, and in particular as such dyestuff components a bromamic acid-condensed reactive dyestuff of the following formula (I):

wherein R means —CH₂CH₂OSO₃M or —CH=CH₂, and M means hydrogen atom, alkali metals, alkaline earth metals or quarternary amines, and a copper-formazane reactive dyestuff of the following formula (II):

wherein X means chlorine atom or fluorine atom are preferably used.

Preferably, to the mixture of the both reactive dyestuffs is further added a copper-formazane reactive dyestuff of the following formula (III):

wherein R has the above meanings.

It is possible to adjust a dyeing concentration, a hue and so on by adding the third reactive dyestuff (III) to the mixture of the dyestuffs of the formulae (I) and (II).

In particular, the mixture of the dyestuffs Nos. 1 to 3 described in the following EXAMPLES is an ideal blue mixture for dyeing by the trichromatic combination, which has a superior dyeing behavior and a high fastness property.

In case of dyeing a cellulose fiber by using the dyestuff mixture according to this invention, it is preferred to carry out the dyeing at the temperature in the range of 20° to 130° C. at the pH value in the range of 8 to 13. It is advantageous that the mixing ratio of the dyestuffs of the formulae (I) and (II) to be preferably used is 2 to 8:8 to 2, and that of the dyestuffs of the formulae (I), (II) and (III) is 3 to 7:6 to 2:1.

To the dyestuff composition can be generally added various kinds of the conventional auxiliaries such as, for example, extenders, dusting inhibitors, surfactants, pH-regulators.

The dyestuff composition can be used for dyeing cellulose fibers by the conventional method for the reactive dyestuffs.

This invention will be clearly understood by the following examples, which may not be construed as limiting. In the examples all parts given are by weight.

EXAMPLE 1

100 parts of a mercerized cotton woven fabric was treated by means of a winch dyeing machine with a dye liquor (pH-value: 11.5) which comprises
2.9 parts of the dyestuff No. 1 of the following formula,
2.3 parts of the dyestuff No. 2 of the formula (II) wherein X is F,
0.5 parts of the dyestuff No. 3 of the following formula,
20 parts of sodium carbonate,
100 parts of sodium sulfate, and
1,874 parts of water.

Dyestuff No. 1

Dyestuff No. 3

The dye liquor was heated from 20° to 60° C. for 30 min. and kept at this temperature for one hour. A deep blue dyeing with a high fastness property was obtained after usual washing and soaping of the thus treated fabric.

EXAMPLE 2

100 parts of mixed yarn comprising 50% of cotton and 50% of staple fiber was treated by means of a dyeing machine for yarn with a dye liquor (pH-value: 11.5) which comprises
2.9 parts of the dyestuff No. 1,
2.3 parts of the dyestuff No. 2,
0.6 parts of the dyestuff No. 3,
20 parts of sodium carbonate,
75 parts of sodium sulfate, and
1,399 parts of water.

The dye liquor was heated from 20° to 60° C. for 30 minutes, and the dyeing was carried out at this temperature for one hour. A deep and even blue dyeing with a good fastness property was obtained after usual washing and soaping of the thus treated yarn. The color tone and the color concentration correspond to those in EXAMPLE 1.

EXAMPLE 3

100 parts of a cotton woven fabric was impregnated with a pad liquor (pH-value: 11.5) which comprises
41.4 parts of the dyestuff No. 1,
32.9 parts of the dyestuff No. 2,
8.5 parts of the dyestuff No. 3,
55 parts of water glass (40° Bé),
40 parts of a solution of caustic soda (38° Bé), and
822 parts of water,
and stayed at 20° C. for 24 hours. A deep blue dyeing corresponding to that of Example 1 was obtained after usual washing and soaping of the fabric.

EXAMPLE 4

100 parts of a cotton woven fabric was treated by means of a jet dyeing machine with a dye liquor (pH-value: 11.5) which comprises
1.2 parts of the yellow dyestuff No. 4 of the following formula,
0.3 parts of the red dyestuff No. 5 of the following formula,
0.21 parts of the blue dyestuff No. 1,
0.17 parts of the blue dyestuff No. 2,
0.05 parts of the blue dyestuff No. 3,
20 parts of sodium carbonate,
100 parts of sodium sulfate, and
1,878 parts of water.

brown dyeing with a good fastness property was obtained after usual washing and soaping of the fabric. The even dyeing behavior of the dyestuffs attained a good reproducible property of the color tone.

The mixture of the above blue dyestuffs No. 1, No. 2 and No. 3 shows a new dyeing behavior which is different from that of each mixed component (see FIGS. 2 to 5.).

Figure 1A:
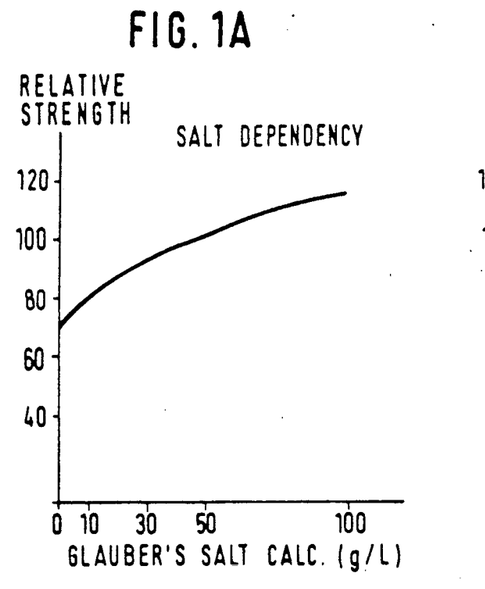
FIGS. 1A to 1D are graphs representing the relationship between the relative strength or the relative dye concentration and the dyeing conditions of the preferred dyestuff composition according to this invention.
Figure 1B:
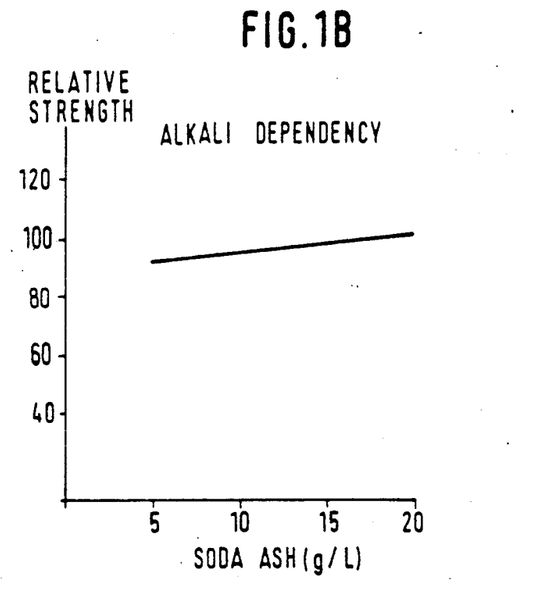
Figure 1C:
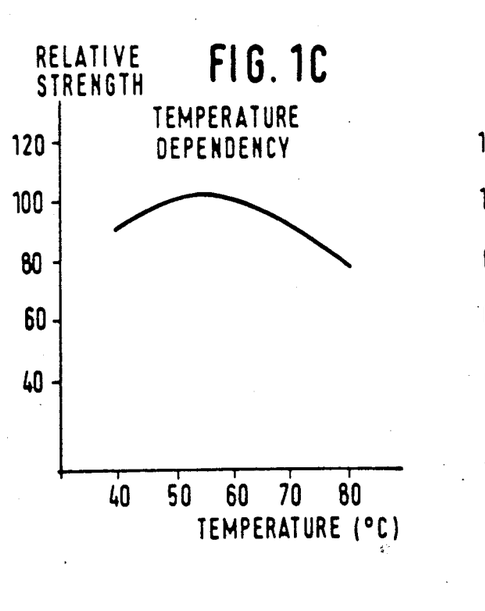
Figure 1D:
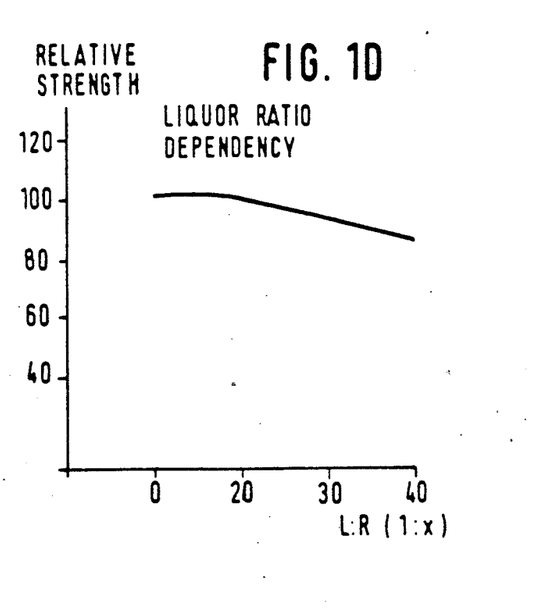
Figure 2:
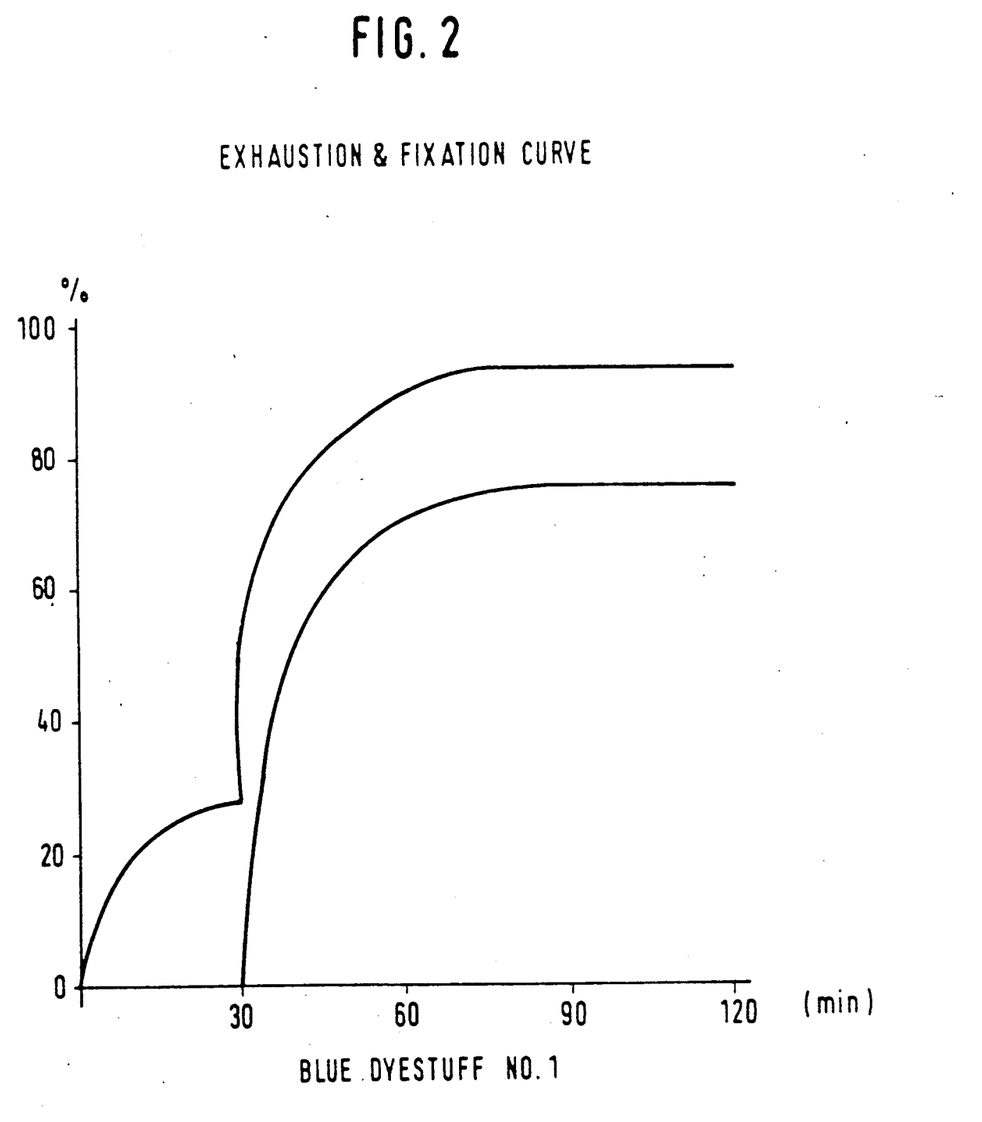
FIGS. 2 to 7 are graphs representing the curves showing exhaustion and fixation of the dyestuffs and the mixture thereof to be preferably used in this invention.
Figure 3:
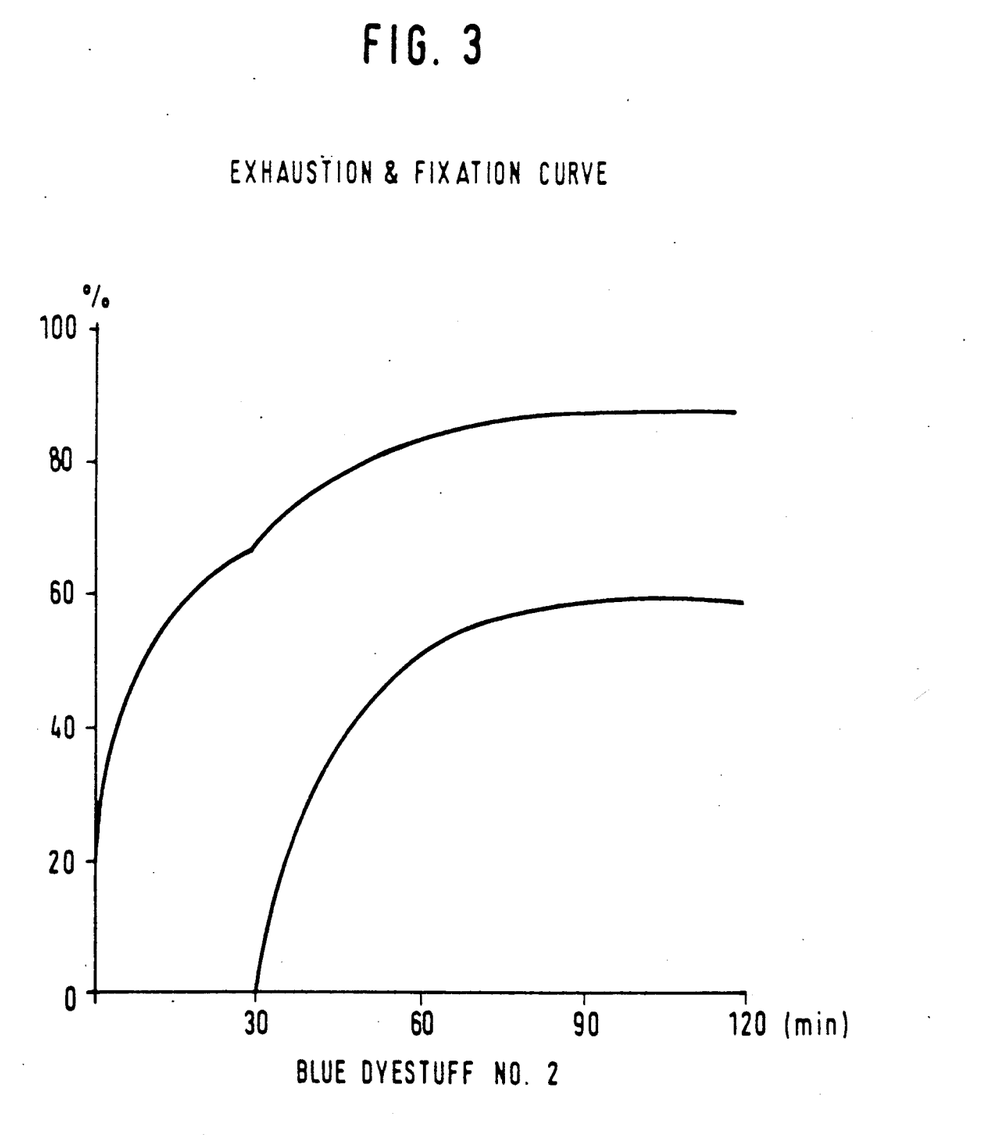
Figure 4:
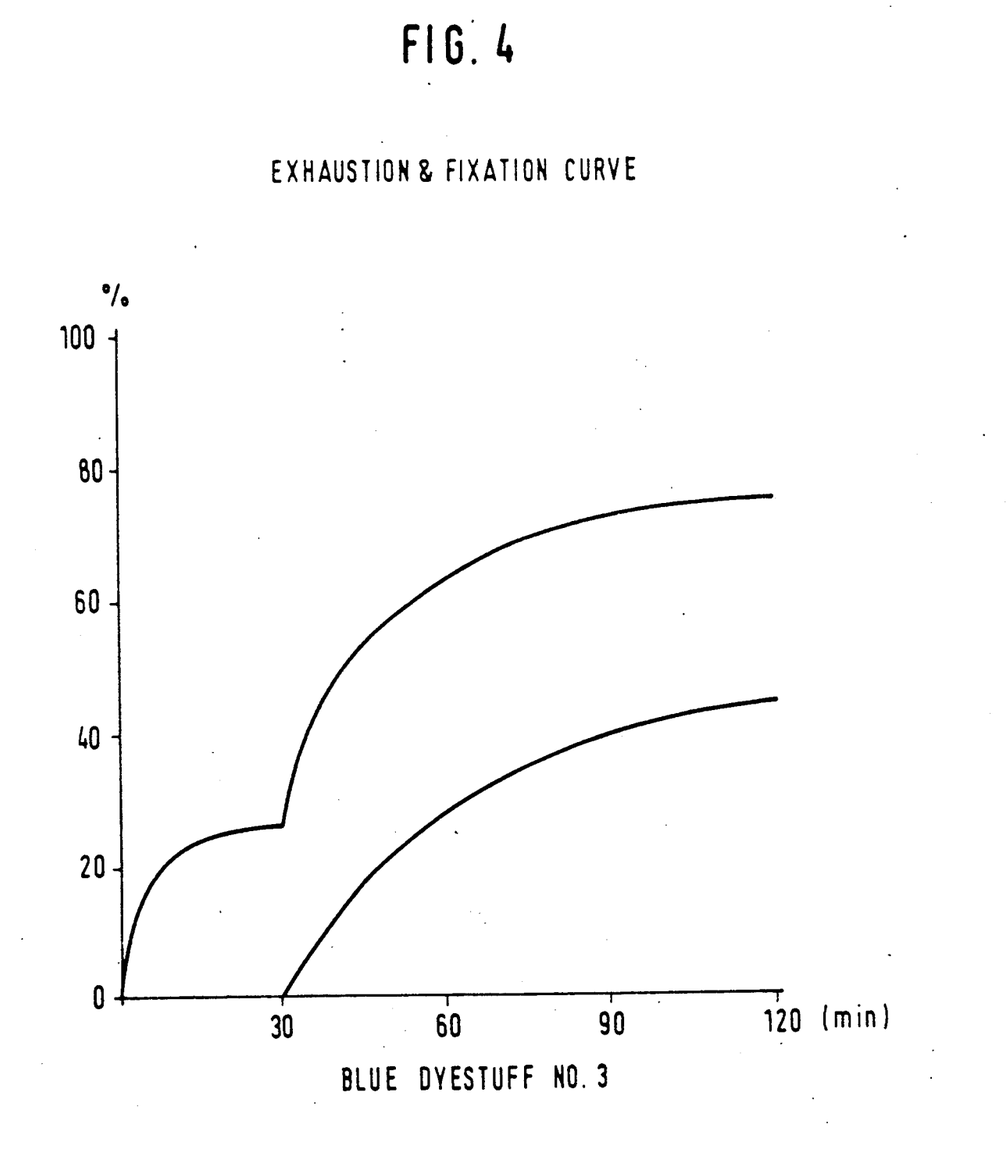
Figure 5:
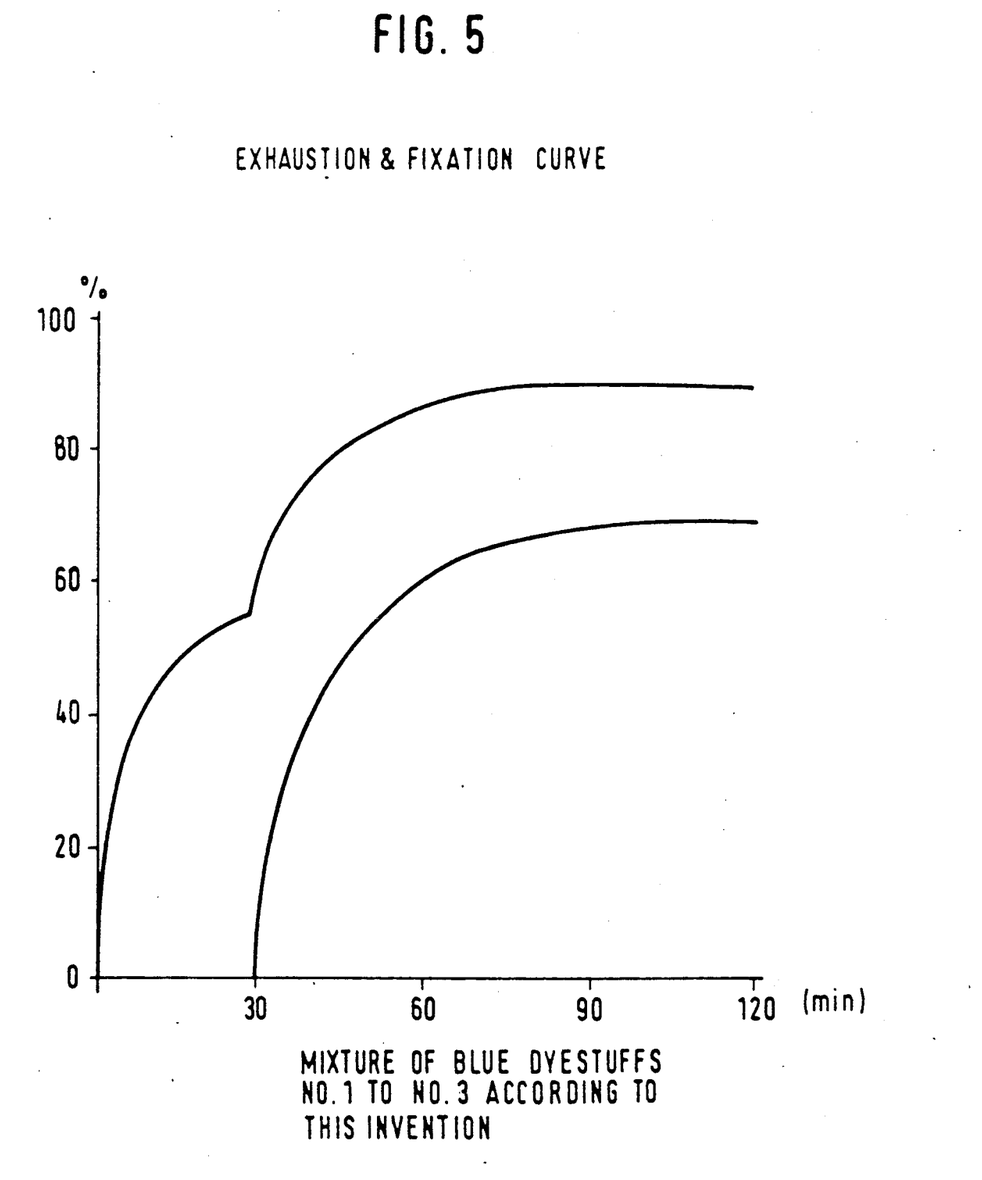
Figure 6:
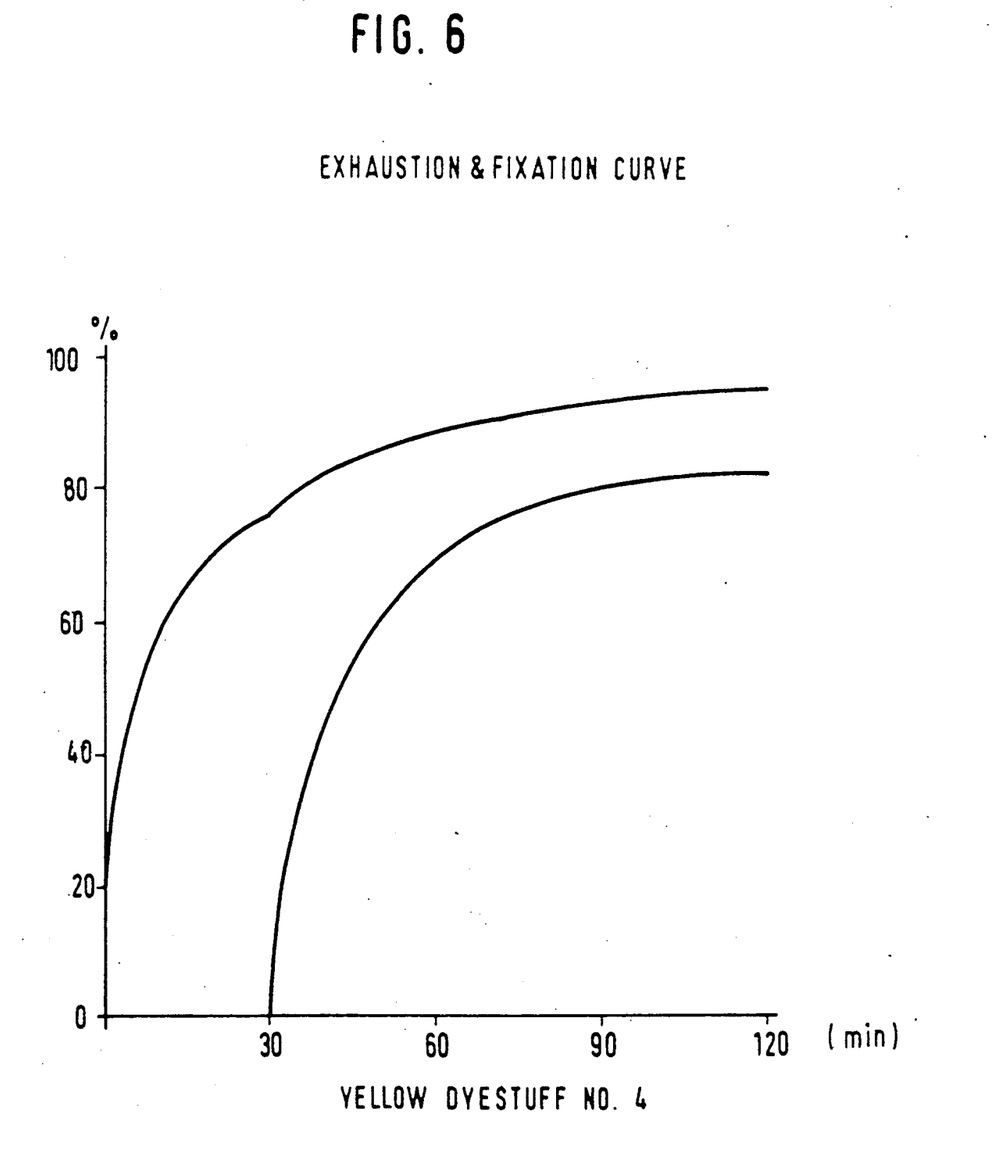
Figure 7:
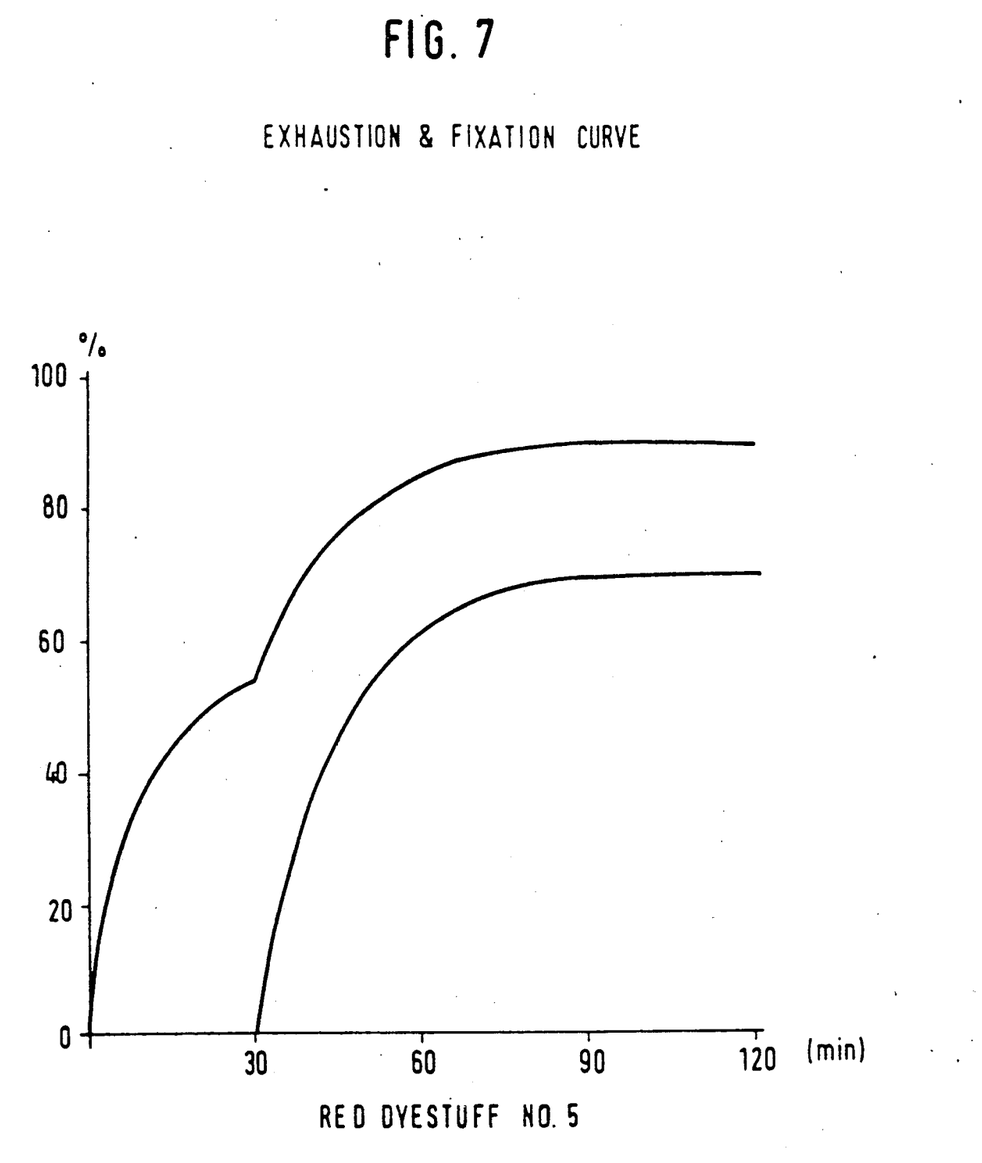

The dyeing behavior of the mixture of the above blue dyestuffs (FIG. 5) is similar to those of the yellow dyestuff No. 4 and the red dyestuff No. 5 (see FIG. 6 and FIG. 7.), which are understood to be suitable for the trichromatic combination.

EXAMPLE 5

100 parts of a cotton woven fabric was treated by means of a jet dyeing machine with a dye liquor (pH-value: 11.5) which comprises
0.315 parts of the yellow dyestuff No. 4,
0.168 parts of the red dyestuff No. 5,
0.253 parts of the blue dyestuff No. 1,
0.202 parts of the blue dyestuff No. 2,
0.051 parts of the blue dyestuff No. 3,
15 parts of sodium carbonate,
100 parts of sodium sulfate, and
1,884 parts of water.

The dye liquor was heated from 20° to 60° C. for 30 minutes and kept at this temperature for one hour. A genuine gray dyeing with a high fastness property was obtained after washing and soaping of the trichromatic dyeing by a conventional method. The even dyeing behavior of the dyestuffs attained a good reproducible property of the color tone.

Dyestuff No.4

Dyestuff No.5

The dye liquor was heated from 20° to 60° C. for 30 minutes and kept at this temperature for one hour. A

EXAMPLE 6

Variations of dyeing 100 parts of a cotton woven fabric was dyed with a dye liquor (pH-value: 11.5) which comprises
1 part of the dyestuff No. 1,
0.8 parts of the dyestuff No. 2,
0.2 parts of the dyestuff No. 3,
30 parts of sodium carbonate,
100 parts of sodium sulfate, and
1,818 parts of water.

The dye liquor was heated from 20° to 60° C. for 25 minutes and kept at this temperature for one hour. A blue dyeing was obtained after washing and soaping of the dyeing by a conventional method, which was used as a comparison base for coloristic and reflection spectrophotometric examination.

Dyeings with the dye liquor having the same composition were repeated at 40°, 50°, 70° and 80° C.

Dyeing examples for the comparison base were repeated but in each case the amount of sodium carbonate corresponds to 10, 20 or 40 parts.

Furthermore, dyeing examples for the comparison base were repeated but in each case the amount of sodium sulfate corresponds to 20, 60, 150 or 200 parts.

The color tones of these dyeing variations were, in comparison with the above-described base, closely similar to that of the latter (see FIG. 1A to FIG. 1D).

EXAMPLE 7

100 parts of cotton or rayon yarn and textile fabric were dyed by means of a winch dyeing machine or a package dyeing machine with a dye liquor (pH-value: 11.5) which comprises
0.4 parts of the blue dyestuff No. 1,
0.6 parts of the blue dyestuff No. 2,
0.5 parts of the yellow dyestuff No. 4,
0.33 parts of the red dyestuff No. 5,
40 parts of sodium carbonate,
100 parts of sodium sulfate, and
2,000 parts of water.

The liquor was heated from 30° to 60° C. for 30 minutes and kept at this temperature for one hour. A gray dyeing with a high fastness property was obtained after washing and soaping of the dyeing by a conventional method. The even dyeing behavior of the dyestuffs attained a good reproducible property.

What is claimed is:

1. A reactive dyestuff composition comprising:
a bromamic acid-condensed reactive dyestuff of the following formula (I):

a copper-formazane reactive dyestuff of the formula (II):

and a copper-formazane reactive dyestuff of the formula (III):

wherein:
R is $-CH_2CH_2OSO_3M$, or $CH=CH_2$;
M is a hydrogen atom, an alkali metal, an alkaline earth metal, or a quarternary amine; and
X is a chlorine atom or fluorine atom, and the ratio of the reactive dyestuffs of the formulae (I), (II), and (III) is in the range of 3 to 7:6 to 2:1.

2. A method for dyeing cellulose fibers comprising the step of dyeing with the reactive dyestuff composition of claim 1 at a temperature in the range of 20° to 130° C. and at a pH value in the range of 8 to 13.

* * * * *